United States Patent
Sheepwash et al.

(10) Patent No.: US 11,667,774 B2
(45) Date of Patent: Jun. 6, 2023

(54) RUBBER VULCANIZATION PROCESSES EMPLOYING AN EUTECTIC MIXTURE

(71) Applicant: Bridgestone Corporation, Chuo-ku (JP)

(72) Inventors: Erin Sheepwash, Cuyahoga Falls, OH (US); Julia A. Dart, Sterling Heights, MI (US); Michael C. Davis, Hockessin, DE (US)

(73) Assignee: Bridgestone Corporation, Chuo-ku (JP)

( * ) Notice: Subject to any disclaimer, the term of this patent is extended or adjusted under 35 U.S.C. 154(b) by 246 days.

(21) Appl. No.: 16/760,509

(22) PCT Filed: Oct. 31, 2018

(86) PCT No.: PCT/US2018/058502
§ 371 (c)(1),
(2) Date: Apr. 30, 2020

(87) PCT Pub. No.: WO2019/089788
PCT Pub. Date: May 9, 2019

(65) Prior Publication Data
US 2021/0198459 A1  Jul. 1, 2021

Related U.S. Application Data

(60) Provisional application No. 62/579,641, filed on Oct. 31, 2017.

(51) Int. Cl.
*C08L 9/06*  (2006.01)
*C08L 7/00*  (2006.01)

(52) U.S. Cl.
CPC .............. *C08L 9/06* (2013.01); *C08L 7/00* (2013.01); *C08L 2205/035* (2013.01)

(58) Field of Classification Search
CPC ........ C08L 9/06; C08L 7/00; C08L 2205/035; C08L 21/00; C08L 23/28; C08L 9/00; C08L 91/00; C08K 3/04; C08K 3/16; C08K 3/36; C08K 5/053; C08K 5/21
USPC ........................................................ 524/432
See application file for complete search history.

(56) References Cited

U.S. PATENT DOCUMENTS

| | | | |
|---|---|---|---|
| 6,322,721 | B1 | 11/2001 | Yankner et al. |
| 9,006,335 | B2 | 4/2015 | Iizuka et al. |
| 2016/0053097 | A1 | 2/2016 | Koda et al. |
| 2016/0358687 | A1 | 12/2016 | Zhang |
| 2017/0333602 | A1 | 11/2017 | Amiralian et al. |
| 2017/0342240 | A1* | 11/2017 | Natarajan ............ C08L 7/00 |

FOREIGN PATENT DOCUMENTS

| | | | |
|---|---|---|---|
| CN | 1563181 | 1/2005 | |
| CN | 101429299 A | 5/2009 | |
| CN | 103752214 | 4/2014 | |
| DE | 2835494 | 2/1980 | |
| DE | 102007034590 A1 * | 2/2008 | ............ B01J 13/16 |
| JP | S57159850 | 10/1982 | |
| JP | 03137117 A * | 6/1991 | ............ B01J 13/16 |
| JP | 2003202722 | 7/2003 | |
| JP | 2010237445 | 10/2010 | |
| JP | 2013097117 | 5/2013 | |
| JP | 2016028865 | 3/2016 | |
| KR | 10-0962630 | 6/2010 | |
| RU | 2596251 C1 | 9/2016 | |
| WO | 2011045944 | 4/2011 | |
| WO | 2016090425 A1 | 6/2016 | |

OTHER PUBLICATIONS

DE 2835494 A1, InnovationQ Plus (ip.com), machine translation. (Year: 1980).*
JP 03-137117 A, machine translation, EPO espacenet. (Year: 1991).*
DE 10-2007-034590 A1, machine translation, EPO espacenet. (Year: 2007).*
CN 101429299 A, machine translation, Google Patents. (Year: 2009).*
RU 2596251 C1, machine translation, Google Patents. (Year: 2016).*
Dumitru, C. -S. et al., Electrodeposition of Zinc Oxide Films from Choline Chloride Based Ionic Liquid Media Containing Zinc and Nitrate Ions. U.P.B. Sci. Bull., Series B, 2016, vol. 78, No. 3, pp. 59-74 See p. 59, Introduction; and p. 72, Conclusion.
Gorton, A. D. T., Natural Rubber Latex Concentrate Properties and Processibility, Rubber Chemistry and Technology, 1972, vol. 45, No. 5, pp. 1202-1223. See pp. 1202-1203.
International Search Report and Written Opinion, dated Feb. 22, 2019 for corresponding International Application PCT/US2018/058502 , pp. 1-13.
Maciejewska et al.; Thermal analysis and mechanical methods applied to studying properties of SBR compounds containing ionic liquids; May 31, 2017; Polymer Testing 61; 349-363.
Mao; Exploration of the Feasibility of Reduction of Zinc Oxide; World Rubber Industry, vol. 39, No. 1; 2012.
Longfei et al.; Progress in Rubber Vulcanization Accelerator; Progress in Chemistry, vol. 27, No. 10, pp. 1500-1508; Oct. 15, 2015.
Office Action in China application No. 201880071361.1; dated Nov. 25, 2021.
Office Action dated Jul. 20, 2021 in Japanese Patent Application No. 2020-524176.
EP Search Report dated Jul. 12, 2021 in European Patent Application No. 18872557.6.
Smith, E. L. et al., "Deep eutectic solvents (DESs) and their application", Chemical Reviews, 2014, vol. 114, pp. 11060-11082.

(Continued)

*Primary Examiner* — Frances Tischler
(74) *Attorney, Agent, or Firm* — Meredith E. Hooker; Arthur M. Reginelli

(57) ABSTRACT

A process for preparing a rubber vulcanizate, the process comprising (i) providing a vulcanizable composition of matter including a sulfur-based curative, zinc oxide, and a eutectic solvent; and (ii) heating the vulcanizable composition to thereby effect vulcanization.

16 Claims, No Drawings

(56) References Cited

OTHER PUBLICATIONS

Maka, H. et al., "Deep eutectic ionic liquids as epoxy resin curing agents", International Journal of Polymer Analysis and Characterization, 2014, vol. 19, pp. 682-692.

* cited by examiner

RUBBER VULCANIZATION PROCESSES EMPLOYING AN EUTECTIC MIXTURE

This application is a National-Stage application of PCT/US2018/058502 filed on Oct. 31, 2018, which claims the benefit of U.S. Provisional Application Ser. No. 62/579,641 filed on Oct. 31, 2017, which are incorporated herein by reference.

FIELD OF THE INVENTION

Embodiments of the present invention are directed toward processes for sulfur curing diene-based rubber compositions in the presence of zinc oxide and a eutectic solvent.

BACKGROUND OF THE INVENTION

Zinc oxide, typically in combination with stearic acid, is commonly used in the sulfur vulcanization of rubber. It is believed that zinc species and/or zinc oxide serve as an activator for the sulfur crosslinking. It is also believed that the zinc oxide and stearic acid form, in situ, zinc species, and in combination with the zinc oxide, the rate and quality of the sulfur vulcanization process is impacted.

The zinc oxide conventionally employed in sulfur vulcanization processes is characterized by a BET surface area of less than 10 m²/g, which zinc oxide can be referred to as micro zinc oxide. Generally, rubber vulcanization, especially in the tire art, requires at least about 2 parts by weight (pbw) zinc oxide per 100 pbw rubber to effect a desired cure. Nano zinc oxide, which has a BET surface area greater than 10 m²/g, has also been proposed, and it has been suggested that the use of nano zinc oxide can provide improved processes that ultimately require less loading of zinc oxide or other zinc species. The use of nano zinc oxide, however, presents several difficulties including manufacturing problems as well as particle agglomeration.

There remains a desire to reduce the level of zinc, particularly zinc oxide, used in the manufacture of tire components.

SUMMARY OF THE INVENTION

One or more embodiments of the present invention provide a process for preparing a rubber vulcanizate, the process comprising providing a vulcanizable composition of matter including a sulfur-based curative, zinc oxide, and a eutectic composition; and heating the vulcanizable composition to thereby effect vulcanization.

Yet other embodiments of the present invention provide a rubber vulcanizate comprising a vulcanized rubber network including a metal compound dispersed throughout the rubber network, said vulcanized rubber including less than 2 parts by weight zinc oxide per 100 parts by weight rubber.

Still other embodiments of the present invention provide a rubber vulcanizate prepared by a process comprising the steps of preparing a rubber vulcanizate, the process comprising providing a vulcanizable composition of matter including a sulfur-based curative, zinc oxide, and a eutectic composition; and heating the vulcanizable composition to thereby effect vulcanization.

Yet other embodiments of the present invention provide a method for preparing a vulcanizable composition of matter, the method comprising combining a vulcanizable rubber, a curative, and a eutectic composition.

DETAILED DESCRIPTION OF ILLUSTRATIVE EMBODIMENTS

Embodiments of the invention are based, at least in part, on the discovery of a process for the sulfur vulcanization of rubber compositions that includes curing the rubber in the presence of a metal compound (such as zinc species) and a eutectic composition. It has unexpectedly been discovered that by including the eutectic composition in the vulcanizable composition, the total loading of metal compounds that are necessary to achieve a desired cure can be appreciably reduced without a deleterious impact on cure rate and/or cure quality of the rubber. And, in certain embodiments, the inclusion of the eutectic composition surprisingly has led to other improvements in one or more of the vulcanizate properties such as reduced wear and reduced rolling resistance. Accordingly, embodiments of the invention provide cured tire components having relatively low levels of metal, such as zinc, and technologically useful level of cure.

Vulcanizable Compositions

As indicated above, a eutectic composition is introduced to a vulcanizable composition for the production of a sulfur-cured vulcanizate. In addition to the eutectic composition, the vulcanizable compositions of one or more embodiments include a vulcanizable rubber, a filler, a sulfur-based curative, stearic acid, and a metal compound, such as zinc oxide or derivatives zinc oxide. Other optional ingredients may also be included such as, but not limited to, processing and/or extender oils, resins, waxes, cure accelerators, scorch inhibitors, antidegradants, antioxidants, and other rubber compounding additives known in the art.

Eutectic Mixture

In one or more embodiments, a eutectic composition includes those compositions formed by combining two or more compounds that provide a resultant combination having a melting point lower than the respective compounds that are combined. For purposes of this specification, eutectic composition may be referred to as a eutectic mixture, eutectic complex, or eutectic pair. Each of the compounds that are combined may be referred to, respectively, as a eutectic ingredient, eutectic constituent, eutectic member, or compound for forming a eutectic composition (e.g. first and second compound). Depending on the relative amounts of the respective eutectic ingredients, as well as the temperature at which the observation is made, the eutectic composition may be in the form of a liquid, which may be referred to as a eutectic liquid or eutectic solvent. For a given composition, where relative amounts of the respective ingredients are at or proximate to the lowest melting point of the eutectic mixture, then composition may be referred to as a deep eutectic solvent, which may be referred to as DES.

Without wishing to be bound by any particular theory, it is believed that the eutectic ingredients combine, otherwise react or interact to form a complex. Thus, any reference to eutectic mixture, or eutectic combination, eutectic pair, or eutectic complex will include combinations and reaction products or complexes between the constituents that are combined that yield a lower melting point than the respective constituents. For example, in one or more embodiments, useful eutectic compositions can be defined by the formula I:

$$Cat^+X^-zY$$

where $Cat^+$ is a cation, $X^-$ is a counter anion (e.g. Lewis Base), and z refers to the number of Y molecules that interact with the counter anion (e.g. Lewis or Bronsted Acid). For example, $Cat^+$ can include an ammonium, phosphonium, or sulfonium cation. X⁻ may include, for example, a halide ion. Y may include, for example, a hydrogen bond donor, a metal halide or a metal halide hydrate. In one or more embodiments, z is a number that achieves a deep eutectic solvent, or in other embodiments a number that otherwise achieves a complex having a melting point lower than the respective eutectic constituents.

In one or more embodiments, useful eutectic compositions include a combination of an acid and a base, where the acid and base may include Lewis acids and bases or Bronsted acids and bases. In one or more embodiments, useful eutectic compositions include a combination of a quaternary ammonium salt with a metal halide (which are referred to as Type I eutectic composition), a combination of a quaternary ammonium salt and a metal halide hydrate (which are referred to as Type II eutectic composition), a combination of a quaternary ammonium salt and a hydrogen bond donor (which are referred to as Type III eutectic composition), or a combination of a metal halide hydrate and a hydrogen bond donor (which are referred to as Type IV eutectic composition). Analogous combinations of sulfonium or phosphonium in lieu of ammonium compounds can also be employed and can be readily envisaged by those having skill in the art.

Quaternary Ammonium Salt

In one or more embodiments, the quaternary ammonium salt is a solid at 20° C. In these or other embodiments, the metal halide and hydrogen bond donor are solid at 20° C.

In one or more embodiments, useful quaternary ammonium salts, which may also be referred to as ammonium compounds, may be defined by the formula II:

$$(R_1)(R_2)(R_3)(R_4)-N^+\text{-}\varphi^-$$

where each $R_1$, $R_2$, $R_3$, and $R_4$ is individually hydrogen or a monovalent organic group, or, in the alternative, two of $R_1$, $R_2$, $R_3$, and $R_4$ join to form a divalent organic group, and $\varphi^-$ is a counter anion. In one or more embodiments, at least one, in other embodiments at least two, and in other embodiments at least three of $R_1$, $R_2$, $R_3$, and $R_4$ are not hydrogen.

In one or more embodiments, the counter anion (e.g. $\varphi^-$) is selected from the group consisting of halide ($X^-$), nitrate ($NO_3^-$), tetrafluoroborate ($BF_4^-$), perchlorate ($ClO_4^-$), triflate ($SO_3CF_3^-$), trifluoroacetate ($COOCF_3^-$). In one or more embodiments, $\varphi^-$ is a halide ion, and in certain embodiments a chloride ion.

In one or more embodiments, the monovalent organic groups include hydrocarbyl groups, and the divalent organic groups include hydrocarbylene groups. In one or more embodiments, the monovalent and divalent organic groups include a heteroatom, such as, but not limited to, oxygen and nitrogen, and/or a halogen atom. Accordingly, the monovalent organic groups may include alkoxy groups, siloxy groups, ether groups, and ester groups, as well as carbonyl or acetyl substituents. In one or more embodiments, the hydrocarbyl groups and hydrocarbylene group include from 1 (or the appropriate minimum number) to about 18 carbon atoms, in other embodiments from 1 to about 12 carbon atoms, and in other embodiments from 1 to about 6 carbon atoms. The hydrocarbyl and hydrocarbylene groups may be branched, cyclic, or linear. Exemplary types of hydrocarbyl groups include alkyl, cycloalkyl, aryl and alkylaryl groups. Exemplary types of hydrocarbylene groups include alkylene, cycloalkylene, arylene, and alkylarylene groups. In particular embodiments, the hydrocarbyl groups are selected from the group consisting of methyl, ethyl, octadecyl, phenyl, and benzyl groups. In certain embodiments, the hydrocarbyl groups are methyl groups, and the hydrocarbylene groups are ethylene or propylene group.

Useful types of ammonium compounds include secondary ammonium compounds, tertiary ammonium compounds, and quaternary ammonium compounds. In these or other embodiments, the ammonium compounds include ammonium halides such as, but not limited to, ammonium chloride. In particular embodiments, the ammonium compound is a quaternary ammonium chloride. In certain embodiments, $R_1$, $R_2$, $R_3$, and $R_4$ are hydrogen, and the ammonium compound is ammonium chloride. In one or more embodiments, the ammonium compounds are asymmetric.

In one or more embodiments, the ammonium compound includes an alkoxy group and can be defined by the formula III:

$$(R_1)(R_2)(R_3)-N^+-(R_4-OH)\varphi^-$$

where each $R_1$, $R_2$, and $R_3$ is individually hydrogen or a monovalent organic group, or, in the alternative, two of $R_1$, $R_2$, and $R_3$ join to form a divalent organic group, $R_4$ is a divalent organic group, and $\varphi^-$ is a counter anion. In one or more embodiments, at least one, in other embodiments at least two, and in other embodiments at least three of $R_1$, $R_2$, $R_3$, and are not hydrogen.

Examples of ammonium compounds defined by the formula III include, but are not limited to, N-ethyl-2-hydroxy-N,N-dimethylethanaminium chloride, 2-hydroxy-N,N,N-trimethylethanaminium chloride (which is also known as choline chloride), and N-benzyl-2-hydroxy-N,N-dimethlethanaminium chloride.

In one or more embodiments, the ammonium compound includes a halogen-containing substituent and can be defined by the formula IV:

$$\varphi^-\text{-}(R_1)(R_2)(R_3)-N^+-R_4X$$

where each $R_1$, $R_2$, and $R_3$ is individually hydrogen or a monovalent organic group, or, in the alternative, two of $R_1$, $R_2$, and $R_3$ join to form a divalent organic group, $R_4$ is a divalent organic group, X is a halogen atom, and $\varphi^-$ is a counter anion. In one or more embodiments, at least one, in other embodiments at least two, and in other embodiments at least three of $R_1$, $R_2$, $R_3$, and are not hydrogen. In one or more embodiments, X is chlorine.

Examples of ammonium compounds defined by the formula III include, but are not limited to, 2-chloro-N,N,N-trimethylethanaminium (which is also referred to as chlorcholine chloride), and 2-(chlorocarbonyloxy)-N,N,N-trimethylethanaminium chloride.

Hydrogen-Bond Donor Compounds

In one or more embodiments, the hydrogen-bond donor compounds, which may also be referred to as HBD compounds, include, but are not limited to, amines, amides, carboxylic acids, and alcohols. In one or more embodiments, the hydrogen-bond donor compound includes a hydrocarbon chain constituent. The hydrocarbon chain constituent may include a carbon chain length including at least 2, in other embodiments at least 3, and in other embodiments at least 5 carbon atoms. In these or other embodiments, the hydrocarbon chain constituent has a carbon chain length of less than 30, in other embodiments less than 20, and in other embodiments less than 10 carbon atoms.

In one or more embodiments, useful amines include those compounds defined by the formula:

$$R_1-(CH_2)_x-R_2$$

wherein $R_1$ and $R_2$ are $-NH_2$, $-NHR_3$, or $-NR_3R_4$, and x is an integer of at least 2. In one or more embodiments, x is from 2 to about 10, in other embodiments from about 2 to about 8, and in other embodiments from about 2 to about 6.

Specific examples of useful amines include, but are not limited to, aliphatic amines, ethylenediamine, diethylenetriamine, aminoethylpiperazine, triethylenetetramine, tris(2-aminoethyl)amine, N,N'-bis-(2aminoethyle)piperazine, piperazinoethylethylenediamine, and tetraethylenepentaamine, propyleneamine, aniline, substituted aniline, and combinations thereof.

In one or more embodiments, useful amides include those compounds defined by the formula:

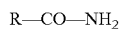

wherein R is H, $NH_2$, $CH_3$, or $CF_3$.

Specific examples of useful amides include, but are not limited to, urea, 1-methyl urea, 1,1-dimethyl urea, 1,3-dimethylurea, thiourea, urea, benzamide, acetamide, and combinations thereof.

In one or more embodiments, useful carboxylic acids include mono-functional, di-functional, and tri-functional organic acids. These organic acids may include alkyl acids, aryl acids, and mixed alkyl-aryl acids.

Specific examples of useful mono-functional carboxylic acids include, but are not limited to, aliphatic acids, phenylpropionic acid, phenylacetic acid, benzoic acid, and combinations thereof. Specific examples of di-functional carboxylic acids include, but are not limited to, oxalic acid, malonic acid, adipic acid, succinic acid, and combinations thereof. Specific examples of tri-functional carboxylic acids include citric acid, tricarballylic acid, and combinations thereof.

Types of alcohols include, but are not limited to, monools, diols, and triols. Specific examples of monools include aliphatic alcohols, phenol, substituted phenol, and mixtures thereof. Specific examples of diols include ethylene glycol, propylene glycol, resorcinol, substituted resorcinol, and mixtures thereof. Specific examples of triols include, but are not limited to, glycerol, benzene triol, and mixtures thereof.

Metal Halides

Types of metal halides include, but are not limited to, chlorides, bromides, iodides and fluorides. In one or more embodiments, these metal halides include, but are not limited to, transition metal halides. The skilled person can readily envisage the corresponding metal halide hydrates.

Specific examples of useful metal halides include, but are not limited to, aluminum chloride, aluminum bromide, aluminum iodide, zinc chloride, zinc bromide, zinc iodide, tin chloride, tin bromide, tin iodide, iron chloride, iron bromide, iron iodide, and combinations thereof. The skilled person can readily envisage the corresponding metal halide hydrates. For example, aluminum chloride hexahydrate and copper chloride dihydrate correspond to the halides mentioned above.

Formation of Eutectic Complex

The skilled person can select the appropriate eutectic members at the appropriate molar ratio to provide the desired eutectic composition. The skilled person appreciates that the molar ratio of the first compound (e.g. Lewis base) of the pair to the second compound (e.g. Lewis acid) of the pair will vary based upon the compounds selected. As the skilled person will also appreciate, the melting point suppression of a eutectic solvent includes the eutectic point, which is the molar ratio of the first compound to the second compound that yields the minimum melting point suppression (i.e. deep eutectic solvent). The molar ratio of the first compound to the second compound can, however, be varied to nonetheless produce a suppression in the melting point of a eutectic solvent relative to the individual melting points of the first and second compounds that is not the minimum melting point. Practice of one or more embodiments of the present invention therefore includes the formation a eutectic solvent at molar ratios outside of the eutectic point.

In one or more embodiments, the compounds of the eutectic pair, as well as the molar ratio of the first compound to the second compound of the pair, are selected to yield a mixture having a melting point below 130° C., in other embodiments below 110° C., in other embodiments below 100° C., in other embodiments below 80° C., in other embodiments below 60° C., in other embodiments below 40° C., and in other embodiments below 30° C. In these or other embodiments, the compounds of the eutectic pair, as well as the molar ratio of the compounds, are selected to yield a mixture having a melting point above 0° C., in other embodiments above 10° C., in other embodiments above 20° C., in other embodiments above 30° C., and in other embodiments above 40° C.

In one or more embodiments, the compounds of the eutectic pair, as well as the molar ratio of the first compound to the second compound of the pair, are selected to yield a eutectic solvent having an ability or capacity to dissolve desired metal compounds, which may be referred to as solubility or solubility power. As the skilled person will appreciate, this solubility can be quantified based upon the weight of metal compound dissolved in a given weight of eutectic solvent over a specified time at a specified temperature and pressure when saturated solutions are prepared. In one or more embodiments, the eutectic solvents of the present invention are selected to achieve a solubility for zinc oxide, over 24 hours at 50° C. under atmospheric pressure, of greater than 100 ppm, in other embodiments greater than 500 ppm, in other embodiments greater than 1000 ppm, in other embodiments greater than 1200 ppm, in other embodiments greater than 1400 ppm, and in other embodiments greater than 1600 ppm, where ppm is measured on a weight solute to weight solvent basis.

In one or more embodiments, a eutectic solvent is formed by combining the first compound with the second compound at an appropriate molar ratio to provide a solvent composition (i.e. liquid composition at the desired temperature). The mixture may be mechanically agitated by using various techniques including, but not limited to, solid state mixing or blending techniques. Generally speaking, the mixture is mixed or otherwise agitated until a liquid that is visibly homogeneous is formed. Also, the mixture may be formed at elevated temperatures. For example, the eutectic solvent may be formed by heating the mixture to a temperature of greater than 50° C., in other embodiments greater than 70° C., and in other embodiments greater than 90° C. Mixing may continue during the heating of the mixture. Once a desired mixture is formed, the eutectic solvent can be cooled to room temperature. In one or more embodiments, the cooling of the eutectic solvent may take place at a controlled rate such as at a rate of less than 1° C./min.

In one or more embodiments, useful eutectic compositions can be obtained commercially. For example, deep eutectic solvents are commercially available under the tradenames Ionic Liquids from Scionix. Useful eutectic compositions are also generally known as described in U.S. Publ. Nos. 2004/0097755 A1 and 2011/0207633 A1, which are incorporated herein by reference.

Vulcanizable Rubber

In one or more embodiments, the vulcanizable rubber, which may also be referred to as a rubber or a vulcanizable elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more $\alpha$-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

Filler

As suggested above, the vulcanizable compositions of the invention may include one or more fillers. These filler materials may include reinforcing and non-reinforcing fillers. Exemplary fillers include carbon black, silica, and sundry inorganic fillers.

Useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Examples of suitable silica fillers include precipitated amorphous silica, wet silica (hydrated silicic acid), dry silica (anhydrous silicic acid), fumed silica, calcium silicate, aluminum silicate, magnesium silicate, and the like.

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

Where one or more silicas is employed, the pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano) tetrasulfides.

Other useful filler materials include sundry inorganic and organic fillers. Examples of organic fillers include starch. Examples of inorganic fillers include silica, aluminum hydroxide, magnesium hydroxide, titanium oxides, boron nitrides, iron oxides, mica, talc (hydrated magnesium silicate), and clays (hydrated aluminum silicates).

Resins

As suggested above, the vulcanizable compositions of the invention may include one or more resins. These resins may include phenolic resins and hydrocarbon resins such as cycloaliphatic resins, aliphatic resins, aromatic resins, terpene resins, and combinations thereof. Useful resins are commercially available from various companies including, for example, Chemfax, Dow Chemical Company, Eastman Chemical Company, Idemitsu, Neville Chemical Company, Nippon, Polysat Inc., Resinall Corp., Pinova Inc., Yasuhara Chemical Co., Ltd., Arizona Chemical, and SI Group Inc., and Zeon under various trade names.

In one or more embodiments, useful hydrocarbon resins may be characterized by a glass transition temperature (Tg) of from about 30 to about 160° C., in other embodiments from about 35 to about 60° C., and in other embodiments from about 70 to about 110° C. In one or more embodiments, useful hydrocarbon resins may also be characterized by its softening point being higher than its Tg. In certain embodiments, useful hydrocarbon resins have a softening point of of from about 70 to about 160° C., in other embodiments from about 75 to about 120° C., and in other embodiments from about 120 to about 160° C.

In certain embodiments, one or more cycloaliphatic resins are used in combination with one or more of an aliphatic, aromatic, and terpene resins. In one or more embodiments, one or more cycloaliphatic resins are employed as the major weight component (e.g. greater than 50% by weight) relative to total load of resin. For example, the resins employed include at least 55% by weight, in other embodiments at least 80% by weight, and in other embodiments at least 99% by weight of one or more cycloaliphatic resins.

In one or more embodiments, cycloaliphatic resins include both cycloaliphatic homopolymer resins and cycloaliphatic copolymer resins including those deriving from cycloaliphatic monomers, optionally in combination with one or more other (non-cycloaliphatic) monomers, with the majority by weight of all monomers being cycloaliphatic. Non-limiting examples of useful cycloaliphatic resins suitable include cyclopentadiene ("CPD") homopolymer or copolymer resins, dicyclopentadiene ("DCPD") homopolymer or copolymer resins, and combinations thereof. Non-limiting examples of cycloaliphatic copolymer resins include CPD/vinyl aromatic copolymer resins, DCPD/vinyl aromatic copolymer resins, CPD/terpene copolymer resins, DCPD/terpene copolymer resins, CPD/aliphatic copolymer resins (e.g., CPD/C5 fraction copolymer resins), DCPD/ aliphatic copolymer resins (e.g., DCPD/C5 fraction copolymer resins), CPD/aromatic copolymer resins (e.g., CPD/C9 fraction copolymer resins), DCPD/aromatic copolymer resins (e.g., DCPD/C9 fraction copolymer resins), CPD/aromatic-aliphatic copolymer resins (e.g., CPD/C5 & C9 fraction copolymer resins), DCPD/aromatic-aliphatic copolymer resins (e.g., DCPD/C5 & C9 fraction copolymer resins), CPD/vinyl aromatic copolymer resins (e.g., CPD/styrene copolymer resins), DCPD/vinyl aromatic copolymer resins (e.g., DCPD/styrene copolymer resins), CPD/terpene copolymer resins (e.g., limonene/CPD copolymer resin), and DCPD/terpene copolymer resins (e.g., limonene/DCPD copolymer resins). In certain embodiments, the cycloaliphatic resin may include a hydrogenated form of one of the cycloaliphatic resins discussed above (i.e., a hydrogenated cycloaliphatic resin). In other embodiments, the cycloaliphatic resin excludes any hydrogenated cycloaliphatic resin; in other words, the cycloaliphatic resin is not hydrogenated.

In certain embodiments, one or more aromatic resins are used in combination with one or more of an aliphatic, cycloaliphatic, and terpene resins. In one or more embodiments, one or more aromatic resins are employed as the major weight component (e.g. greater than 50% by weight) relative to total load of resin. For example, the resins employed include at least 55% by weight, in other embodiments at least 80% by weight, and in other embodiments at least 99% by weight of one or more aromatic resins.

In one or more embodiments, aromatic resins include both aromatic homopolymer resins and aromatic copolymer resins including those deriving from one or more aromatic monomers in combination with one or more other (non-aromatic) monomers, with the largest amount of any type of monomer being aromatic. Non-limiting examples of useful aromatic resins include coumarone-indene resins and alkylphenol resins, as well as vinyl aromatic homopolymer or copolymer resins, such as those deriving from one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene or any vinyl aromatic monomer resulting from C9 fraction or C8-C10 fraction. Non-limiting examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin). Non-limiting examples of alkyl-phenol resins include alkylphenol-acetylene resins such as p-tert-butylphenol-acetylene resins, alkylphenol-formaldehyde resins (such as those having a low degree of polymerization. In certain embodiments, the aromatic resin may include a hydrogenated form of one of the aromatic resins discussed above (i.e., a hydrogenated aromatic resin). In other embodiments, the aromatic resin excludes any hydrogenated aromatic resin; in other words, the aromatic resin is not hydrogenated.

In certain embodiments, one or more aliphatic resins are used in combination with one or more of cycloaliphatic, aromatic and terpene resins. In one or more embodiments, one or more aliphatic resins are employed as the major weight component (e.g. greater than 50% by weight) relative to total load of resin. For example, the resins employed include at least 55% by weight, in other embodiments at least 80% by weight, and in other embodiments at least 99% by weight of one or more aliphatic resins.

In one or more embodiments, aliphatic resins include both aliphatic homopolymer resins and aliphatic copolymer resins including those deriving from one or more aliphatic monomers in combination with one or more other (non-aliphatic) monomers, with the largest amount of any type of monomer being aliphatic. Non-limiting examples of useful aliphatic resins include C5 fraction homopolymer or copolymer resins, C5 fraction/C9 fraction copolymer resins, C5 fraction/vinyl aromatic copolymer resins (e.g., C5 fraction/styrene copolymer resin), C5 fraction/cycloaliphatic copolymer resins, C5 fraction/C9 fraction/cycloaliphatic copolymer resins, and combinations thereof. Non-limiting examples of cycloaliphatic monomers include, but are not limited to cyclopentadiene ("CPD") and dicyclopentadiene ("DCPD"). In certain embodiments, the aliphatic resin may include a hydrogenated form of one of the aliphatic resins discussed above (i.e., a hydrogenated aliphatic resin). In other embodiments, the aliphatic resin excludes any hydrogenated aliphatic resin; in other words, in such embodiments, the aliphatic resin is not hydrogenated.

In one or more embodiments, terpene resins include both terpene homopolymer resins and terpene copolymer resins including those deriving from one or more terpene monomers in combination with one or more other (non-terpene) monomers, with the largest amount of any type of monomer being terpene. Non-limiting examples of useful terpene resins include alpha-pinene resins, beta-pinene resins, limonene resins (e.g., L-limonene, D-limonene, dipentene which is a racemic mixture of L- and D-isomers), beta-phellandrene, delta-3-carene, delta-2-carene, pinene-limonene copolymer resins, terpene-phenol resins, aromatic modified terpene resins and combinations thereof. In certain embodiments, the terpene resin may include a hydrogenated form of one of the terpene resins discussed above (i.e., a hydrogenated terpene resin). In other embodiments, the terpene resin excludes any hydrogenated terpene resin; in other words, in such embodiments, the terpene resin is not hydrogenated.

Curatives

The rubber curing agents (also called vulcanizing agents) include sulfur-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazole vulcanization accelerators, such as 2-mercaptobenzothiazole, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

Other Ingredients

Other ingredients that are typically employed in rubber compounding may also be added to the rubber compositions. These include accelerators, accelerator activators, oils, additional plasticizers, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, hemp oil, cashew oil, sesame oil, camellia oil, jojoba oil, macadamia nut oil, coconut oil, and palm oil.

Metal Activator and Organic Acid

As suggested above, the vulcanizable compositions of the present invention include a metal compound. In one or more embodiments, the metal compound is an activator (i.e. assists in the vulcanization or cure of the rubber). In other embodiments, the metal activator is a metal oxide. In particular embodiments, the metal activator is zinc oxide. In other embodiments, the metal activator is a zinc species that is formed in situ through a reaction or interaction between zinc oxide and organic acid (e.g. stearic acid). In other embodiments, the metal compound is a magnesium compound such as magnesium hydroxide. In other embodiments, the metal compound is an iron compound such as an iron oxide. In other embodiments, the metal compound is a cobalt compound such as a cobalt carboxylate.

In one or more embodiments, the zinc oxide is an unfunctionalized zinc oxide characterized by a BET surface area of less than 10 $m^2/g$, in other embodiments less than 9 $m^2/g$, and in other embodiments less than 8 $m^2/g$. In other embodiments, nano zinc oxide is employed, which includes those zinc oxide particles that are characterized by a BET surface area of greater than 10 $m^2/g$.

In one or more embodiments, the organic acid is a carboxylic acid. In particular embodiments, the carboxylic acid is a fatty acid including saturated and unsaturated fatty acids. In particular embodiments, saturated fatty acids, such as stearic acid, are employed. Other useful acids include, but are not limited to, palmitic acid, arachidic acid, oleic acid, linoleic acid, and arachidonic acid.

Ingredient Amounts

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Eutectic Composition

In one or more embodiments, the vulcanizable compositions include greater than 0.005, in other embodiments greater than 0.01, and in other embodiments greater than 0.02 parts by weight (pbw) of the eutectic composition per 100 parts by weight rubber (phr). In these or other embodiments, the vulcanizable compositions include less than 3, in other embodiments less than 1, and in other embodiments less than 0.1 pbw of the eutectic composition phr. In one or more embodiments, the vulcanizable compositions include from about 0.005 to about 3, in other embodiments from about 0.01 to about 1, and in other embodiments from about 0.02 to about 0.1 pbw of the eutectic composition phr.

In one or more embodiments, the amount of eutectic solvent can be described with reference to the loading of metal activator (such as zinc oxide). In one or more embodiments, the vulcanizable compositions include greater than 2, in other embodiments greater than 3, and in other embodiments greater than 5 wt % eutectic solvent based upon the total weight of the eutectic solvent and the metal activator (e.g. zinc oxide) present within the vulcanizable composition. In these or other embodiments, the vulcanizable compositions include less than 15, in other embodiments less than 12, and in other embodiments less than 10 wt % eutectic solvent based upon the total weight of the eutectic solvent and the metal activator (e.g. zinc oxide) present within the vulcanizable composition. In one or more embodiments, the vulcanizable compositions include from about 2 to about 15, in other embodiments from about 3 to about 12, and in other embodiments from about 5 to about 10 wt % eutectic solvent based upon the total weight of the eutectic solvent and the metal activator (e.g. zinc oxide) present within the vulcanizable composition.

Metal Compound

In one or more embodiments, the vulcanizable compositions include greater than 0.05, in other embodiments greater than 0.1, and in other embodiments greater than 0.15 parts by weight (pbw) of metal activator (e.g. zinc oxide) per 100 parts by weight rubber (phr). In these or other embodiments, the vulcanizable composition includes less than 2, in other embodiments less than 1, and in other embodiments less than 0.75 pbw of metal activator (e.g. zinc oxide) phr. In one or more embodiments, the vulcanizable composition includes from about 0.05 to about 2, in other embodiments from about 0.1 to about 1, and in other embodiments from about 0.15 to about 0.75 pbw of metal activator (e.g. zinc oxide) phr.

Organic Acid

In one or more embodiments, the vulcanizable compositions include greater than 0.5, in other embodiments greater than 0.7, and in other embodiments greater than 1.0 parts by weight (pbw) of organic acid (e.g. stearic acid) per 100 parts by weight rubber (phr). In these or other embodiments, the vulcanizable composition includes less than 5, in other embodiments less than 3, and in other embodiments less than 2 pbw of organic acid (e.g. stearic acid) phr. In one or more embodiments, the vulcanizable composition includes from about 0.5 to about 5, in other embodiments from about 0.7 to about 3, and in other embodiments from about 1.0 to about 2 pbw of organic acid (e.g. stearic acid) phr.

Filler

In one or more embodiments, the vulcanizable compositions include at least 0, in other embodiments at least 10, and in other embodiments at least 20 parts by weight (pbw) of filler per 100 parts by weight rubber (phr). In these or other embodiments, the vulcanizable composition includes at most 200, in other embodiments at most 100, and in other embodiments at most 70 pbw of filler phr. In one or more embodiments, the vulcanizable composition includes from about 0 to about 200, in other embodiments from about 10 to about 100, and in other embodiments from about 20 to about 70 pbw of filler phr.

Carbon Black

In one or more embodiments, the vulcanizable compositions include at least 0, in other embodiments at least 10, and in other embodiments at least 20 parts by weight (pbw) of a carbon black per 100 parts by weight rubber (phr). In these or other embodiments, the vulcanizable composition includes at most 200, in other embodiments at most 100, and in other embodiments at most 70 pbw of a carbon black phr. In one or more embodiments, the vulcanizable composition includes from about 0 to about 200, in other embodiments from about 10 to about 100, and in other embodiments from about 20 to about 70 pbw of a carbon black phr.

Silica

In one or more embodiments, the vulcanizable compositions include at least 5, in other embodiments at least 25, in other embodiments at least 50, and in other embodiments at least 70 parts by weight (pbw) silica per 100 parts by weight rubber (phr). In these or other embodiments, the vulcanizable composition includes at most 200, in other embodiments at most 130, and in other embodiments at most 80 pbw of the silica phr. In one or more embodiments, the vulcanizable composition includes from about 5 to about 200, in other embodiments from about 25 to about 130, and in other embodiments from about 50 to about 80 pbw of silica phr.

Filler Ratio

In one or more embodiments, the vulcanizable compositions can be characterized by the ratio of the amount of a first filler to the amount of a second filler. In one or more embodiments, the ratio of the amount of carbon black to silica is about 1:1, in other embodiments about 10:1, in other embodiments about 14:1, and in other embodiments about 20:1. In one or more embodiments, the ratio of the amount of carbon black to silica is about 1:5, in other embodiments about 1:10, in other embodiments about 1:14, and in other embodiments about 1:20.

Silica Coupling Agent

In one or more embodiments, the vulcanizable compositions include at least 1, in other embodiments at least 2, and in other embodiments at least 5 parts by weight (pbw) silica coupling agent per 100 parts by weight silica. In these or other embodiments, the vulcanizable composition includes at most 20, in other embodiments at most 15, and in other embodiments at most 10 pbw of the silica coupling agent per 100 parts by weight silica. In one or more embodiments, the vulcanizable composition includes from about 1 to about 20, in other embodiments from about 2 to about 15, and in other embodiments from about 5 to about 10 pbw of silica coupling agent per 100 parts by weight silica.

Resin

In one or more embodiments, the vulcanizable compositions include greater than 1, in other embodiments greater than 15, in other embodiments greater than 25, and in other embodiments greater than 35 parts by weight (pbw) of resin (e.g. hydrocarbon resin) per 100 parts by weight rubber (phr). In these or other embodiments, the vulcanizable composition includes less than 150, in other embodiments less than 120, and in other embodiments less than 90 pbw of resin (e.g. hydrocarbon resin) phr. In one or more embodiments, the vulcanizable composition includes from about 1 to about 150, in other embodiments from about 15 to about 120, and in other embodiments from about 25 to about 90 pbw of resin (e.g. hydrocarbon resin) phr.

Process Overview

In one or more embodiments, vulcanizable compositions are prepared by mixing a vulcanizable rubber and the eutectic solvent to form a masterbatch, and then subsequently adding a curative to the masterbatch. The preparation of the masterbatch may take place using one or more sub-mixing steps where, for example, one or more ingredients may be added to the composition sequentially after an initial mixture is prepared by mixing two or more ingredients. Also, using conventional technology, additional ingredients can be added in the preparation of the vulcanizable compositions such as, but not limited to, carbon black, additional fillers, chemically-treated inorganic oxide, silica, silica coupling agent, silica dispersing agent, processing oils, processing aids such as zinc oxide and fatty acid, and antidegradants such as antioxidants or antiozonants.

In one or more embodiments, the eutectic composition is prepared prior to introducing the eutectic composition to the vulcanizable rubber. In other words, the first constituent of the mixture is pre-combined with the second constituent of the mixture prior to introducing the mixture to the vulcanizable composition. In one or more embodiments, the combined constituents of the mixture are mixed until a homogeneous liquid composition is observed.

In one or more embodiments, the eutectic composition is pre-combined with one or more ingredients of the rubber formulation prior to introducing the eutectic mixture to the vulcanizable composition. In other words, in one or more embodiments, a constituent of the vulcanizable composition (e.g. a metal compound such as zinc oxide) is combined with the eutectic mixture to form a pre-combination or masterbatch prior to introducing the pre-combination to the mixer in which the rubber is mixed. For example, zinc oxide may be dissolved in the eutectic solvent prior to introduction to the rubber within the mixer. In other embodiments, the eutectic composition is the minor component of the pre-combination, and therefore the constituent that is pre-mixed with the eutectic composition acts as a carrier for the eutectic composition. For example, the eutectic composition can be combined with a larger volume of zinc oxide, and the zinc oxide will act as a carrier for delivery the combination of zinc oxide and eutectic composition as a solid to the rubber within the mixer. In yet other embodiments, one of the members of the eutectic pair acts as a solid carrier for the eutectic composition, and therefore the combination of the first and second ingredients of the eutectic composition form a pre-combination that can be added as a solid to the rubber within the mixer. The skilled person will appreciate that mixtures of this nature can be formed by combining an excess of the first or second eutectic members is excess, relative to the other eutectic member, to maintain a solid composition at the desired temperature.

In one or more embodiments, the eutectic solvent is introduced to the vulcanizable rubber as an initial ingredient in the formation of a rubber masterbatch. As a result, the eutectic solvent undergoes high shear, high temperature mixing with the rubber. In one or more embodiments, the eutectic solvent undergoes mixing with the rubber at minimum temperatures in excess of 110° C., in other embodiments in excess of 130° C., and in other embodiments in excess of 150° C. In one or more embodiments, high shear, high temperature mixing takes place at a temperature from about 110° C. to about 170° C.

In other embodiments, the eutectic solvent is introduced to the vulcanizable rubber, either sequentially or simultaneously, with the sulfur-based curative. As a result, the eutectic solvent undergoes mixing with the vulcanizable rubber at a maximum temperature below 110° C., in other embodiments below 105° C., and in other embodiments below 100° C. In one or more embodiments, mixing with the curative takes place at a temperature from about 70° C. to about 110° C.

As with the eutectic solvent, the zinc oxide and the stearic acid can be added as initial ingredients to the rubber masterbatch, and therefore these ingredients will undergo high temperature, high shear mixing. Alternatively, the zinc oxide and the stearic acid can be added along with the sulfur-based curative and thereby only undergo low-temperature mixing.

In one or more embodiments, the zinc oxide is introduced to the vulcanizable rubber separately and individually from the eutectic solvent. In other embodiments, the zinc oxide and the eutectic solvent are pre-combined to form a zinc oxide masterbatch, which may include a solution in which the zinc oxide is dissolved or otherwise dispersed in the eutectic solvent. The zinc oxide masterbatch can then be introduced to the vulcanizable rubber.

Mixing Conditions

In one or more embodiments, a vulcanizable composition is prepared by first mixing a vulcanizable rubber and the eutectic solvent at a temperature of from about 140 to about 180, or in other embodiments from about 150 to about 170° C. In certain embodiments, following the initial mixing, the composition (i.e., masterbatch) is cooled to a temperature of less than 100° C., or in other embodiments less than 80° C., and a curative is added. In certain embodiments, mixing is continued at a temperature of from about 90 to about 110° C., or in other embodiments from about 95 to about 105° C., to prepare the final vulcanizable composition.

In one or more embodiments, the masterbatch mixing step, or one or more sub-steps of the masterbatch mixing step, may be characterized by the peak temperature obtained by the composition during the mixing. This peak temperature may also be referred to as a drop temperature. In one or more embodiments, the peak temperature of the composition during the masterbatch mixing step may be at least 140° C., in other embodiments at least 150° C., and in other embodiments at least 160° C. In these or other embodiments, the peak temperature of the composition during the masterbatch mixing step may be from about 140 to about 200° C., in other embodiments from about 150 to about 190° C., and in other embodiments from about 160 to about 180° C.

Final Mixing Step

Following the masterbatch mixing step, a curative or curative system is introduced to the composition and mixing is continued to ultimately form the vulcanizable composition of matter. This mixing step may be referred to as the final mixing step, the curative mixing step, or the productive mixing step. The resultant product from this mixing step may be referred to as the vulcanizable composition.

In one or more embodiments, the final mixing step may be characterized by the peak temperature obtained by the composition during final mixing. As the skilled person will recognize, this temperature may also be referred to as the final drop temperature. In one or more embodiments, the peak temperature of the composition during final mixing may be at most 130° C., in other embodiments at most 110° C., and in other embodiments at most 100° C. In these or other embodiments, the peak temperature of the composition during final mixing may be from about 80 to about 130° C., in other embodiments from about 90 to about 115° C., and in other embodiments from about 95 to about 105° C.

Mixing Equipment

All ingredients of the vulcanizable compositions can be mixed with standard mixing equipment such as internal mixers (e.g. Banbury or Brabender mixers), extruders, kneaders, and two-rolled mills. Mixing can take place singularly or in tandem. As suggested above, the ingredients can be mixed in a single stage, or in other embodiments in two or more stages. For example, in a first stage (i.e., mixing stage), which typically includes the rubber component and filler, a masterbatch is prepared. Once the masterbatch is prepared, the vulcanizing agents may be introduced and mixed into the masterbatch in a final mixing stage, which is typically conducted at relatively low temperatures so as to reduce the chances of premature vulcanization. Additional mixing stages, sometimes called remills, can be employed between the masterbatch mixing stage and the final mixing stage.

Preparation of Tire

The vulcanizable compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

Vulcanizate Characteristics

As indicated above, the vulcanizable compositions of the present invention can be cured to prepare various tire components. These tire components include, without limitation, tire treads, tire sidewalls, belt skims, innerliners, and bead apex.

According to aspects of the present invention, the tire components, which may also be referred to as vulcanizates, are characterized by advantageous cure characteristics while including relatively low levels of metal activator such as zinc species.

In one or more embodiments, the vulcanizates are characterized by including less than 2 pbw, in other embodiments less than 1 phr, and in other embodiments less than 0.7 pbw zinc per 100 pbw rubber.

In one or more embodiments, the tire component is a tire tread. While only including the limited levels of metal activator, such as zinc species, as outlined in this specification, the treads nonetheless are characterized by a 300% modulus of greater than 3 MPa, in other embodiments greater than 5 MPa, and in other embodiments greater than 7 MPa, as determined by ASTM D-412 at room temperature.

In order to demonstrate the practice of the present invention, several vulcanizable compositions were in the following experiments. The vulcanizable compositions were prepared by using the ingredients and mixing order provided in the Tables below. All amounts are presented in parts by weight per 100 parts by weight rubber unless otherwise stated. Generally speaking, the amount and location of zinc oxide and eutectic solvent were varied throughout the experiments. The following Tables also provide the results of some analytical testing that was performed on the compositions and/or vulcanizates prepared therefrom.

Formation of Eutectic Solvent I

A eutectic composition of choline chloride and urea was prepared by mixing one mole of choline chloride with two moles of urea at 100° C. to form a eutectic solvent, which was believed to be a deep eutectic solvent, which may be referred to as DES-I. The DES-I was allowed to cool to room temperature under standard conditions.

Experiment I

In a first set of experiments, vulcanizable compositions were prepared using the rubber formulation and mixing order provided in Table I. This rubber formulation was indicative of a rubber formulation that is useful in the manufacture of tire treads. As shown in Table I, the mix procedure was a three-step mix procedure including a masterbatch mix step, a "remill mix step," and a final mix step. The various mixing steps were performed within a Banbury mixer. During preparation of the masterbatch, the mixer was operated at 75 rpm and a peak compositional temperature of 160° C. was attained. At that point in time, the composition was dropped from the mixer and allowed to cool to below about 85° C. At this point in time, the composition was then reintroduced to the mixer along with the ingredients identified for the "remill stage," and mixing was continued at 75 rpm and a peak compositional temperature of about 160° C. was achieved. The composition was again dropped from the mixer and allowed to cool to below about 50° C. Then, the composition was again reintroduced to the mixer along with the ingredients identified for the "final mix stage." Included among these ingredients was the DES-I and zinc oxide, which were introduced separately and individually, as provided in Table II. Mixing was continued at 40 rpm at with a peak compositional temperature of about 100° C. The composition was then dropped from the mixer and samples were obtained from the composition for purposes of the analytical testing. The results of the analytical testing are provided in Table II.

TABLE I

| Ingredient | phr |
| --- | --- |
| Master | |
| SBR | 70 |
| BR | 30 |
| Carbon Black (N134) | 25 |
| Silica | 50 |
| Paraffinic oil | 10 |
| Wax | 2 |
| Stearic acid | 2 |
| 6PPD (AO) | 1 |
| Remill | |
| Silica | 10 |
| Silane | 6 |
| Final | |
| Sulfur | 1.7 |
| DPG | 0.5 |
| CBS | 1.5 |
| ZnO | Variable |
| DES-I | Variable |

Rheometer measurements were taken using an MDR 2000 operating at temperatures as specified in the Tables. The tensile mechanical properties (Max Stress, Modulus, Elongation, and Toughness) of the vulcanizates were measured by using the standard procedure described in ASTM-D412. The dynamic rheological properties (e.g. tan δ) of the vulcanizates were obtained from temperature-sweep studies, which were conducted over the range from about −80° C. to about 80° C. and 10 Hz.

TABLE II

| | Samples: | | | |
| --- | --- | --- | --- | --- |
| | C1 | C2 | T1 | T2 |
| Variable | | | | |
| ZnO | 2.5 | 0.5 | 0.5 | 0.5 |
| DES | 0 | 0 | 0.025 | 0.05 |
| MDR @ 171° C. | | | | |
| MH-ML(dNm) | 21.2 | 19.2 | 19.3 | 19.4 |
| T2S (min) | 1.05 | 1.15 | 1.17 | 1.16 |
| T50 (min) | 3.73 | 2.44 | 2.36 | 2.47 |
| T90 (min) | 11.3 | 12.08 | 10.1 | 11.3 |

TABLE II-continued

| | Samples: | | | |
| --- | --- | --- | --- | --- |
| | C1 | C2 | T1 | T2 |
| Tensile @ 23° C. | | | | |
| Max Stress (MPa) | 13.7 | 12.5 | 15.1 | 12.4 |
| 50% Modulus (MPa) | 2.83 | 3.16 | 3.06 | 3.05 |
| 100% Modulus (MPa) | 4.87 | 5.57 | 5.22 | 5.25 |
| Max Elongation (%) | 266 | 218.6 | 279 | 236 |
| Toughness (MPa) | 18.7 | 14.5 | 21.8 | 16.6 |
| Rheological data | | | | |
| Tanδ@0° C. | 0.245 | 0.245 | 0.255 | 0.253 |
| Tanδ@60° C. | 0.209 | 0.213 | 0.215 | 0.212 |

The data in Table II shows that the loading of ZnO can be appreciably reduced in the presence of the eutectic solvent.

Experiment II

In a second experiment, DES-I prepared using the same procedure described above introduced to vulcanizable compositions of matter prepared using a two-stage mix procedure was used. The ingredients used and the mixing order are provided in Table III. This rubber formulation is indicative of a rubber formulation that is useful in the manufacture of tire sidewall.

As with the previous experiment, the mix procedure was performed within a Banbury mixer. During preparation of the masterbatch, the mixer was operated at 75 rpm and the peak temperature of 160° C. was attained. At that point in time, the composition was dropped from the mixer and allowed to cool to below about 85° C. Then, the composition was reintroduced to the mixer along with the ingredients identified for the "final mix stage," which included DES-I and zinc oxide in amounts as provided in Table IV. Mixing was continued at 40 rpm at a peak compositional temperature of about 100° C.

TABLE III

| Ingredient | Phr |
| --- | --- |
| Master | |
| NR | 40 |
| BR | 60 |
| Carbon Black (N550) | 45 |
| Paraffinic oil | 6 |
| Wax | 1 |
| Stearic acid | 2 |
| 6PPD (AO) | 2.5 |
| TMQ | 1.5 |
| Resin | 2 |
| Final | |
| Sulfur | 1 |
| CBS | 1.2 |
| ZnO | Variable |
| DES-I | Variable |

As with the previous experiments, the samples were subjected to analytical testing and the results of the tests are set forth in Table IV.

TABLE IV

| | Samples: | | | |
|---|---|---|---|---|
| | C3 | C4 | T3 | T4 |
| Variable | | | | |
| ZnO | 3 | 1 | 1 | 1 |
| DES | 0 | 0 | 0.05 | 0.1 |
| MDR @ 145° C. | | | | |
| MH-ML(dNm) | 12.7 | 11.8 | 12.0 | 12.0 |
| T2S (min) | 8.80 | 8.43 | 6.54 | 6.53 |
| T50 (min) | 10.3 | 9.91 | 7.61 | 7.58 |
| T90 (min) | 15.2 | 14.6 | 11.2 | 11.1 |
| Tensile @ 23° C. | | | | |
| Max Stress (MPa) | 17.7 | 19.8 | 18.6 | 17.9 |
| 50% Modulus (MPa) | 1.37 | 1.35 | 1.38 | 1.40 |
| 100% Modulus (MPa) | 2.44 | 2.40 | 2.48 | 2.51 |
| 300% Modulus (MPa) | 10.1 | 10.1 | 10.3 | 10.4 |
| Max Elongation (%) | 487 | 488 | 503 | 479 |
| Toughness (MPa) | 49.7 | 42.4 | 45.9 | 41.8 |
| Rheological data | | | | |
| Tanδ@60° C. | 0.098 | 0.089 | 0.087 | 0.090 |

The data in Table IV shows that the loading of ZnO can be appreciably reduced in the presence of the eutectic solvent.

Experiment III

In a third experiment, DES-I, which was prepared using the same procedures set forth above, was introduced to a vulcanizable composition of matter that is indicative of a rubber formulation that is useful in the manufacture of tire inner liner. The mixing conditions were the same as provided above for Experiment II. The ingredients used and the mixing order are provided in Table V.

TABLE V

| Ingredient | phr |
|---|---|
| Master | |
| BIIR | 100 |
| Carbon Black (N660) | 50 |
| Paraffinic oil | 8 |
| Resin | 7 |
| Stearic acid | 2 |
| Final | |
| Sulfur | 0.5 |
| MBTS | 1.5 |
| ZnO | Variable |
| DES | Variable |

As with the previous experiments, the samples were subjected to analytical testing and the results of the tests are set forth in Table VI.

TABLE VI

| | Samples: | | | |
|---|---|---|---|---|
| | C5 | C6 | T5 | T6 |
| Variable | | | | |
| ZnO | 3 | 1 | 1 | 1 |
| DES | 0 | 0 | 0.05 | 0.1 |
| MDR @ 160° C. | | | | |
| MH-ML (dNm) | 2.50 | 2.51 | 2.38 | 2.37 |
| T2S (min) | 5.15 | 5.54 | 5.28 | 5.28 |
| T50 (min) | 3.15 | 3.73 | 3.67 | 3.62 |
| T90 (min) | 9.49 | 9.01 | 6.04 | 6.06 |
| Tensile @ 23° C. | | | | |
| Max Stress (MPa) | 8.70 | 8.60 | 8.60 | 8.70 |
| 50% Modulus (MPa) | 0.842 | 0.767 | 0.755 | 0.786 |
| 100% Modulus (MPa) | 1.34 | 1.22 | 1.20 | 1.29 |
| 300% Modulus (MPa) | 4.41 | 4.16 | 4.05 | 4.31 |
| Max Elongation (%) | 601 | 593 | 577 | 574 |
| Toughness (MPa) | 30.6 | 27.7 | 27.9 | 28.9 |
| Rheological data | | | | |
| Tanδ@60° C. | 0.230 | 0.183 | 0.208 | 0.182 |
| Air Permeability | | | | |
| Rate (cc · mm/[m²/day]) | 17.7 | 20.2 | 17.2 | 19.8 |

In addition to MDR, mechanical, and rheological properties, the vulcanizates were analyzed for air permeability pursuant to ASTM D-3985. The data in Table VI shows that the loading of ZnO can be appreciably reduced in the presence of the eutectic solvent.

Experiment IV

In a fourth experiment, DES-I, which was prepared using the same procedures set forth above, was introduced to a vulcanizable composition of matter that is indicative of a rubber formulation that is useful in the manufacture of tire belt skim. The mixing conditions were the same as provided above for Experiment II. The ingredients used and the mixing order are provided in Table VII.

TABLE VII

| Ingredient | Phr |
|---|---|
| Master | |
| NR | 100 |
| Carbon black (N326) | 48 |
| Paraffinic oil | 2.5 |
| Resin | 5 |
| Silica | 12 |
| 6PPD | 2.5 |
| Stearic acid | 1.6 |
| Final | |
| Hexamethoxymethylmelamine | 1.6 |
| Insoluble sulfur | 5 |
| DCBS | 1.5 |
| ZnO | Variable |
| DES | Variable |

As with the previous experiments, the samples were subjected to analytical testing and the results of the tests are set forth in Table VIII.

TABLE VIII

| | Samples: | | | |
|---|---|---|---|---|
| | C7 | C8 | T7 | T8 |
| Variable | | | | |
| ZnO | 8 | 4 | 4 | 4 |
| DES | 0 | 0 | 0.2 | 0.4 |
| MDR @ 145° C. | | | | |
| MH-ML (dNm) | 18.7 | 18.3 | 19.4 | 19.8 |
| T2S (min) | 4.81 | 4.75 | 4.18 | 3.91 |
| T50 (min) | 11.3 | 10.9 | 10.5 | 10.5 |
| T90 (min) | 25.0 | 24.4 | 28.4 | 28.3 |
| Tensile @ 23° C. | | | | |
| Max Stress (MPa) | 24.0 | 25.5 | 24.8 | 23.8 |
| 50% Modulus (MPa) | 2.39 | 2.41 | 2.39 | 2.65 |
| 100% Modulus (MPa) | 4.75 | 4.82 | 4.77 | 5.25 |
| 300% Modulus (MPa) | 18.3 | 18.3 | 18.8 | 19.2 |
| Max Elongation (%) | 391 | 413 | 392 | 371 |
| Toughness (MPa) | 46.1 | 51.9 | 47.1 | 43.8 |
| Rheological data | | | | |
| Tanδ@60° C. | 0.167 | 0.162 | 0.178 | 0.175 |

The data in Table VIII shows that the loading of ZnO can be appreciably reduced in the presence of the eutectic solvent.

Experiment V

In a fifth experiment, DES-I, which was prepared using the same procedures set forth above, was introduced to a vulcanizable composition of matter that is indicative of a rubber formulation that is useful in the manufacture of tire tread. The mixing conditions were the same as provided above for Experiment II except that DES-I was introduced with the masterbatch ingredients as shown in Table IX, which lists the ingredients used and the mixing order. As with the previous experiments, the samples were subjected to analytical testing and the results of the tests are also set forth in Table IX.

TABLE IX

| | Samples: | | | | | | | | | |
|---|---|---|---|---|---|---|---|---|---|---|
| | C9 | C10 | T9 | C11 | C12 | T10 | T11 | C13 | C14 | T12 |
| Master | | | | | | | | | | |
| NR | 70 | 70 | 70 | 50 | 50 | 50 | 50 | 100 | 100 | 100 |
| BR | 30 | 30 | 30 | 30 | 30 | 30 | 30 | — | — | — |
| SBR | — | — | — | 20 | 20 | 20 | 20 | — | — | — |
| Carbon black (N134) | 48 | 48 | 48 | 48 | 48 | 48 | 48 | 48 | 48 | 48 |
| Resin | 1.5 | 1.5 | 1.5 | 1.5 | 1.5 | 1.5 | 1.5 | 1.5 | 1.5 | 1.5 |
| Wax | 1 | 1 | 1 | 1 | 1 | 1 | 1 | 1 | 1 | 1 |
| Stearic acid | 2 | 2 | 2 | 2 | 2 | 2 | 2 | 2 | 2 | 2 |
| 6PPD (AO) | 1 | 1 | 1 | 1 | 1 | 1 | 1 | 1 | 1 | 1 |
| ZnO | 3.5 | 1.75 | 1.75 | 3.5 | 1.75 | 1.75 | 0.70 | 3.5 | 1.75 | 1.75 |
| DES | 0 | 0 | 0.088 | 0 | 0 | 0.088 | 0.035 | 0 | 0 | 0.088 |
| Final | | | | | | | | | | |
| TMQ | 0.3 | 0.3 | 0.3 | 0.3 | 0.3 | 0.3 | 0.3 | 0.3 | 0.3 | 0.3 |
| Sulfur | 1 | 1 | 1 | 1 | 1 | 1 | 1 | 1 | 1 | 1 |
| CBS | 1.3 | 1.3 | 1.3 | 1.3 | 1.3 | 1.3 | 1.3 | 1.3 | 1.3 | 1.3 |
| MDR @ 145° C. | | | | | | | | | | |
| MH-ML (dNm) | 14.6 | 13.9 | 14.1 | 14.8 | 13.8 | 14.4 | 16.4 | 13.8 | 13.9 | 12.9 |
| T2S (min) | 7.67 | 7.21 | 7.09 | 9.58 | 9.34 | 8.18 | 7.33 | 7.51 | 7.25 | 7.48 |
| T50 (min) | 9.25 | 8.49 | 8.32 | 11.4 | 11.1 | 9.80 | 8.42 | 8.97 | 8.53 | 8.89 |
| T90 (min) | 13.59 | 11.86 | 11.64 | 16.2 | 15.9 | 13.4 | 10.6 | 13.0 | 12.6 | 12.9 |
| Tensile @ 23° C. | | | | | | | | | | |
| Max Stress (MPa) | 28.3 | 27.2 | 28.7 | 27.3 | 27.5 | 26.5 | 26.4 | 31.3 | 29.7 | 30.5 |
| 50% Modulus (MPa) | 1.72 | 1.71 | 1.71 | 1.81 | 1.84 | 1.68 | 1.68 | 1.75 | 1.70 | 1.68 |
| 100% Modulus (MPa) | 3.23 | 3.17 | 3.18 | 3.21 | 3.34 | 2.86 | 2.92 | 3.53 | 3.44 | 3.34 |
| 300% Modulus (MPa) | 15.1 | 14.8 | 15.1 | 14.4 | 15.4 | 13.0 | 13.4 | 17.2 | 17.1 | 16.4 |
| Max Elongation (%) | 521 | 501 | 520 | 511 | 484 | 528 | 526 | 513 | 484 | 546 |
| Toughness (MPa) | 70.5 | 64.6 | 70.8 | 65.7 | 62.1 | 65.0 | 65.5 | 77.7 | 67.9 | 82.9 |
| Rheological data | | | | | | | | | | |
| Tanδ@0° C. | 0.196 | 0.220 | 0.209 | 0.242 | 0.243 | 0.245 | 0.229 | 0.239 | 0.238 | 0.235 |
| Tanδ@60° C. | 0.174 | 0.186 | 0.181 | 0.190 | 0.190 | 0.198 | 0.192 | 0.186 | 0.188 | 0.186 |

The data in Table IX shows that the loading of ZnO can be appreciably reduced in the presence of the eutectic solvent.

Formation of Eutectic Solvent II

A eutectic composition of choline chloride and malonic acid was prepared by mixing one mole of choline chloride with one mole of malonic acid at 100° C. to form a eutectic solvent, which was believed to be a deep eutectic solvent, which may be referred to as DES-II. The DES-II was allowed to cool to room temperature under standard conditions.

Experiment VI

In a sixth experiment, DES-I, which was prepared using the same procedures set forth above, and DES-II, which was prepared above, were introduced to a vulcanizable composition of matter as provided in Table X. The mixing conditions were the same as provided above for Experiment II, which lists the ingredients used and the mixing order.

TABLE X

| Ingredient | phr |
|---|---|
| Master | |
| SBR | 100 |
| Final | |
| Stearic acid | 2 |
| Sulfur | 1.3 |
| CBS | 1.7 |
| ZnO | Variable |
| DES (urea) | Variable |
| DES (malonic acid) | Variable |

As with the previous experiments, the samples were subjected to analytical testing and the results of the tests are also set forth in Table XI.

TABLE XI

| | C15 | T13 | T14 | T15 | T16 |
|---|---|---|---|---|---|
| Variable | | | | | |
| ZnO | 2.0 | 0.5 | 0.5 | 0.5 | 0.5 |
| DES-I | 0 | 0.025 | 0.05 | 0 | 0 |
| DES-II | 0 | 0 | 0 | 0.025 | 0.05 |
| MDR @ 171° C. | | | | | |
| MH-ML (dNm) | 8.36 | 8.07 | 8.44 | 8.16 | 8.34 |
| T2S (min) | 9.88 | 8.56 | 7.71 | 8.46 | 7.38 |
| T50 (min) | 10.6 | 9.12 | 8.22 | 8.96 | 7.81 |
| T90 (min) | 13.9 | 11.6 | 10.6 | 11.5 | 10.1 |
| Tensile @ 23° C. | | | | | |
| Max Stress (MPa) | 1.70 | 1.90 | 1.60 | 1.70 | 1.80 |
| 50% Modulus (MPa) | 0.873 | 0.856 | 0.875 | 0.860 | 0.886 |
| 100% Modulus (MPa) | 1.25 | 1.23 | 1.25 | 1.22 | 1.28 |
| Max Elongation (%) | 159 | 185 | 149 | 160 | 169 |

The data in Table VIII shows that the loading of ZnO can be appreciably reduced in the presence of the eutectic solvent.

Various modifications and alterations that do not depart from the scope and spirit of this invention will become apparent to those skilled in the art. This invention is not to be duly limited to the illustrative embodiments set forth herein.

What is claimed is:

1. A method for preparing a vulcanizable composition of matter, the method comprising:
   combining a vulcanizable rubber, a curative, zinc oxide, and a eutectic composition,
   where the eutectic composition includes a combination of an ammonium cation and a hydrogen bond donor, where said vulcanizable composition includes less than 2 parts by weight zinc oxide per 100 parts by weight rubber.

2. A method for preparing a vulcanizable composition of matter, the method comprising:
   combining a vulcanizable rubber, a curative, a metal compound, and a eutectic composition,
   where the eutectic composition is formed by combining choline chloride and urea.

3. The method for preparing a vulcanizable composition of matter of claim 1, where the vulcanizable composition includes from about 0.005 to about 3 parts by weight of the eutectic composition per 100 parts by weight rubber.

4. A method for preparing a vulcanizable composition of matter, the method comprising:
   combining a vulcanizable rubber, a curative, a metal compound, and a eutectic composition,
   where the eutectic composition is defined by the formula $Cat^+X^-zY$, where $Cat^+$ is a cation, $X^-$ is a counter anion, and z refers to the number of Y molecules that combine, react, or interact with the counter anion, where Y is a hydrogen bond donor, a metal halide, or a metal halide hydrate.

5. The method for preparing a vulcanizable composition of matter of claim 4, where $Cat^+$ is an ammonium, phosphonium, or sulfonium cation and $X^-$ is a halide ion.

6. A method for preparing a vulcanizable composition of matter, the method comprising:
   combining a vulcanizable rubber, a curative, a metal compound, and a eutectic composition,
   where the eutectic composition is formed by combining an ammonium compound with a metal halide, a metal halide hydrate, or a hydrogen bond donor,
   where the ammonium compound is defined by the formula II:

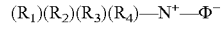

$(R_1)(R_2)(R_3)(R_4)-N^+-\Phi^-$ where each $R_1$, $R_2$, $R_3$, and $R_4$ is individually hydrogen or a monovalent organic group, or, in the alternative, two of $R_1$, $R_2$, $R_3$, and $R_4$ join to form a divalent organic group, and 1 is a counter anion; and
   where the hydrogen bond donor is selected from the group consisting of amines, amides, carboxylic acids, and alcohols.

7. The method for preparing a vulcanizable composition of matter of claim 1, further comprising a step of heating the vulcanizable composition to thereby effect vulcanization to thereby form a rubber vulcanizate.

8. The method of claim 7, where the rubber vulcanizate is a tire tread, and where the rubber vulcanizate is characterized by a 300% modulus that is greater than 3 MPa.

9. The method of claim 7, where said rubber vulcanizate includes less than 1 part by weight zinc oxide per 100 parts by weight rubber.

10. The method for preparing a vulcanizable composition of matter of claim 4, where the counter anion is a Lewis Base.

11. The method for preparing a vulcanizable composition of matter of claim 2, where the metal compound is zinc oxide, where the vulcanizable composition includes less than 2 parts by weight zinc oxide per 100 parts by weight rubber, where the vulcanizable composition includes from about 0.005 to about 3 parts by weight of the eutectic composition per 100 parts by weight rubber.

12. The method for preparing a vulcanizable composition of matter of claim 4, where the metal compound is zinc oxide, where the vulcanizable composition includes less than 2 parts by weight zinc oxide per 100 parts by weight rubber, where the vulcanizable composition includes from about 0.005 to about 3 parts by weight of the eutectic composition per 100 parts by weight rubber.

13. The method for preparing a vulcanizable composition of matter of claim 6, where the metal compound is zinc oxide, where the vulcanizable composition includes less than 2 parts by weight zinc oxide per 100 parts by weight rubber, where the vulcanizable composition includes from about 0.005 to about 3 parts by weight of the eutectic composition per 100 parts by weight rubber.

14. The method for preparing a vulcanizable composition of matter of claim 2, further comprising a step of heating the vulcanizable composition to thereby effect vulcanization to thereby form a rubber vulcanizate.

15. The method for preparing a vulcanizable composition of matter of claim 4, further comprising a step of heating the vulcanizable composition to thereby effect vulcanization to thereby form a rubber vulcanizate.

16. The method for preparing a vulcanizable composition of matter of claim 6, further comprising a step of heating the vulcanizable composition to thereby effect vulcanization to thereby form a rubber vulcanizate.

\* \* \* \* \*